(12) United States Patent
Harada et al.

(10) Patent No.: US 11,039,454 B2
(45) Date of Patent: Jun. 15, 2021

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/496,211

(22) PCT Filed: Mar. 23, 2017

(86) PCT No.: PCT/JP2017/011889
§ 371 (c)(1),
(2) Date: Sep. 20, 2019

(87) PCT Pub. No.: WO2018/173232
PCT Pub. Date: Sep. 27, 2018

(65) Prior Publication Data
US 2020/0053738 A1  Feb. 13, 2020

(51) Int. Cl.
*H04W 72/08* (2009.01)
*H04L 5/00* (2006.01)
(Continued)

(52) U.S. Cl.
CPC ........ *H04W 72/085* (2013.01); *H04B 7/0626* (2013.01); *H04L 5/0048* (2013.01);
(Continued)

(58) Field of Classification Search
CPC ... H04W 72/085; H04B 7/0626; H04L 5/0048
(Continued)

(56) References Cited

U.S. PATENT DOCUMENTS

2015/0092768 A1* 4/2015 Ng ..................... H04W 48/16
370/350
2015/0223245 A1* 8/2015 Cheng ................. H04J 11/0069
370/329
(Continued)

FOREIGN PATENT DOCUMENTS

JP 2016-514382 A 5/2016
JP 2017-005767 A 1/2017
(Continued)

OTHER PUBLICATIONS

International Search Report issued in PCT/JP2017011889 dated May 9, 2017 (2 Pages).
(Continued)

*Primary Examiner* — Peter G Solinsky
(74) *Attorney, Agent, or Firm* — Osha Bergman Watanabe & Burton LLP

(57) ABSTRACT

The present invention is designed to configure RRM measurement properly. A user terminal according to one aspect of the present invention has a receiving section that receives information about a parameter that is common among a plurality of resources for a reference signal, and a control section that controls, based on information about the parameter, reporting of results of measurement using the reference signal in part of the plurality of resources, and information about measured resources.

11 Claims, 14 Drawing Sheets

(51) Int. Cl.
 *H04W 24/10* (2009.01)
 *H04W 56/00* (2009.01)
 *H04B 7/06* (2006.01)
(52) U.S. Cl.
 CPC .......... *H04L 5/0057* (2013.01); *H04W 24/10* (2013.01); *H04W 56/0005* (2013.01)
(58) Field of Classification Search
 USPC ......................................................... 370/252
 See application file for complete search history.

(56) References Cited

U.S. PATENT DOCUMENTS

| | | | |
|---|---|---|---|
| 2015/0341914 A1 | 11/2015 | Lee et al. | |
| 2015/0358848 A1* | 12/2015 | Kim ..................... | H04L 5/0053 370/252 |
| 2016/0352477 A1* | 12/2016 | Nishio .............. | H04W 72/0473 |
| 2017/0195028 A1* | 7/2017 | Shimezawa ........... | H04W 72/04 |
| 2017/0222696 A1* | 8/2017 | Ji .......................... | H04L 5/0051 |
| 2017/0264407 A1* | 9/2017 | Hwang ............... | H04W 52/241 |
| 2019/0124539 A1* | 4/2019 | Kim ..................... | H04L 5/0057 |
| 2019/0327762 A1* | 10/2019 | Takeda ............. | H04W 72/0406 |
| 2020/0106504 A1* | 4/2020 | Noh ..................... | H04B 7/0626 |

FOREIGN PATENT DOCUMENTS

| | | |
|---|---|---|
| NO | 2017020688 A1 | 2/2017 |
| WO | 2016/121538 A1 | 8/2016 |

OTHER PUBLICATIONS

Written Opinion of the International Searching Authority issued in PCT/JP2017/011889 dated May 9, 2017 (5 Pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)"; Mar. 2010 (149 Pages).

3GPP TSG RAN WG1 Meeting #78; R1-143216 "Views on discovery signal-based RRM measurement procedures" NTT DOCOMO; Dresden, Germany; Aug. 18-22, 2014 (6 pages).

3GPP TSG RAN WG1 Meeting #85; R1-164858 "Discussion on efficient utilization of BF CSI-RS" Huawei, HiSilicon; Nanjing, China; May 23-27, 2016 (4 pages).

3GPP TSG-RAN WG1 #88; R1-17xxxxx "On the CSI-RS configurations for NR CSI acquisition" Nokia, Alcatel-Lucent Shanghai Bell; Athens, Greece; Feb. 13-17, 2017 (4 pages).

Extended European Search Report issued in European Application No. 17901549.0, dated Nov. 9, 2020 (10 pages).

3GPP TSG RAN WG1 Meeting #88; R1-1702466 "Discussion on QCL for NR" LG Electronics; Athens, Greece; Feb. 13-17, 2017 (3 pages).

Office Action issued in Japanese Application No. 2019-506865; dated Apr. 6, 2021 (6 pages).

* cited by examiner

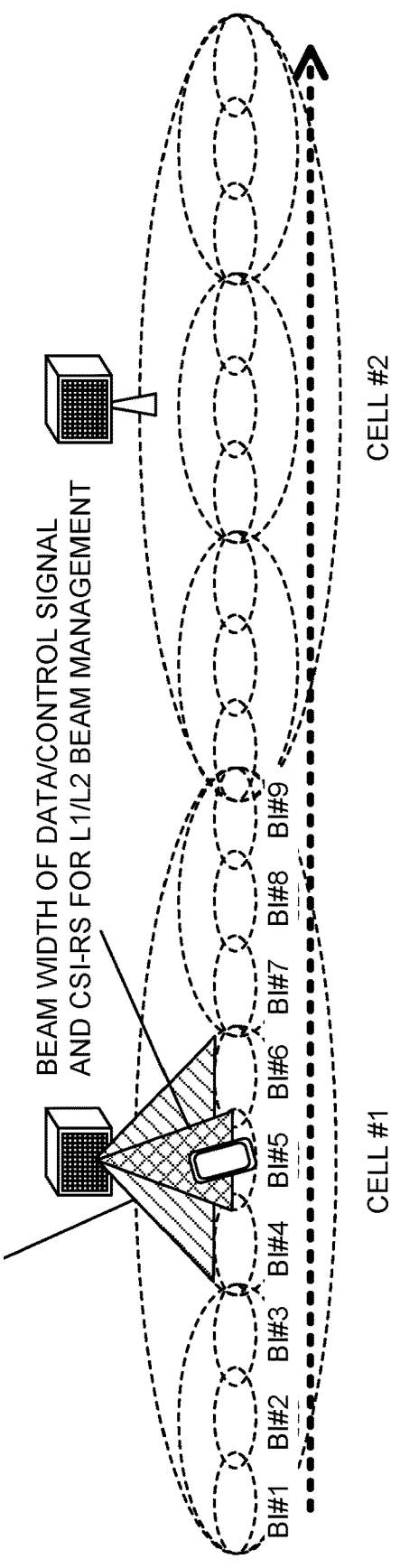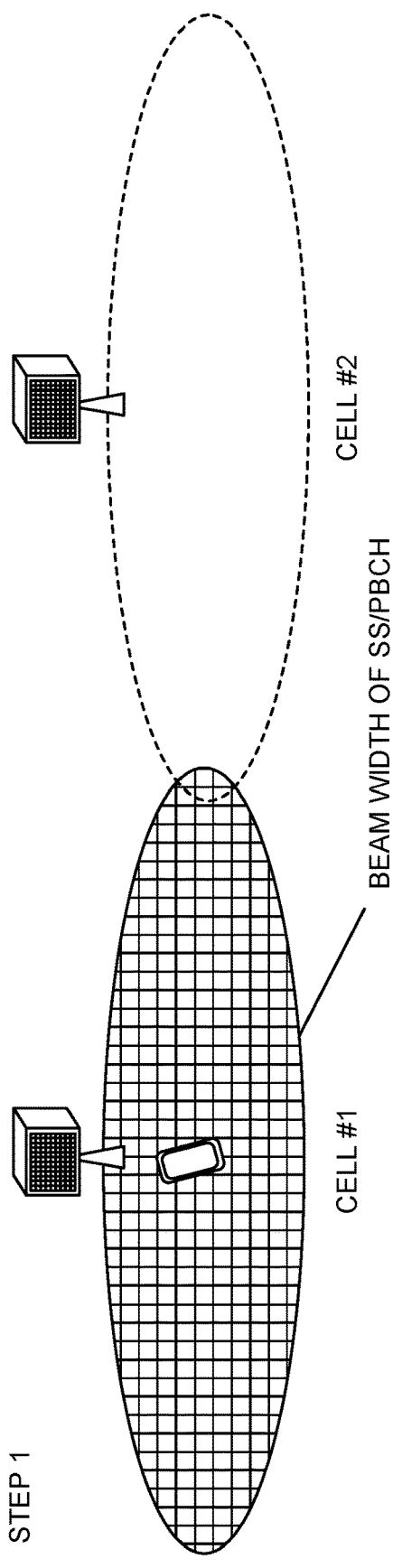

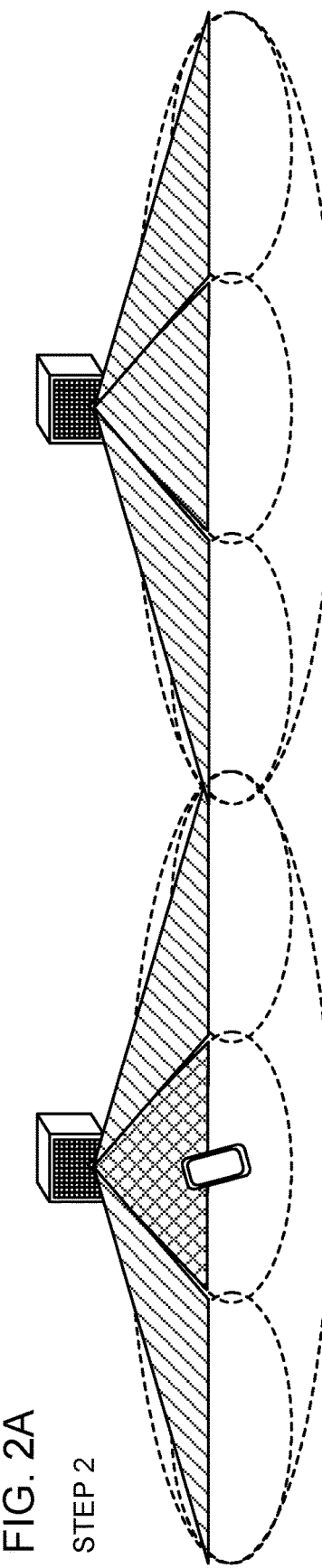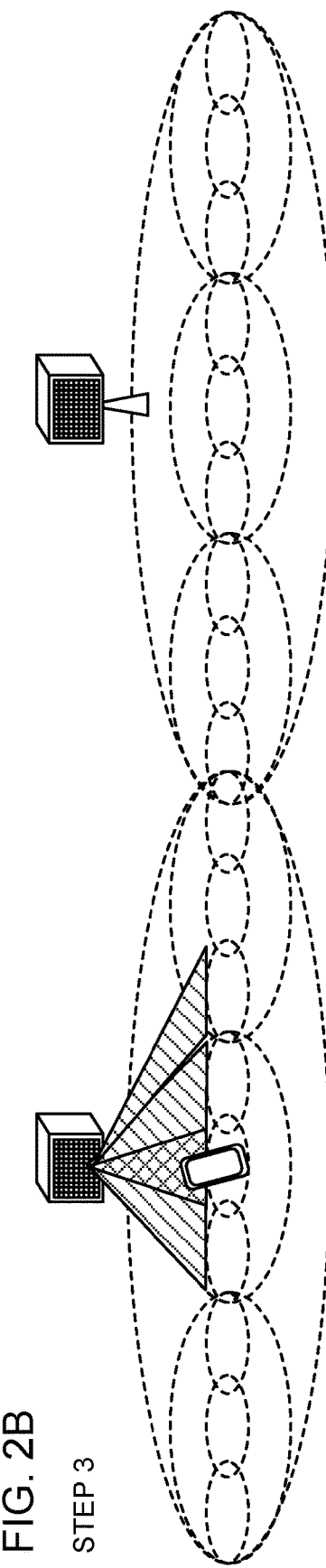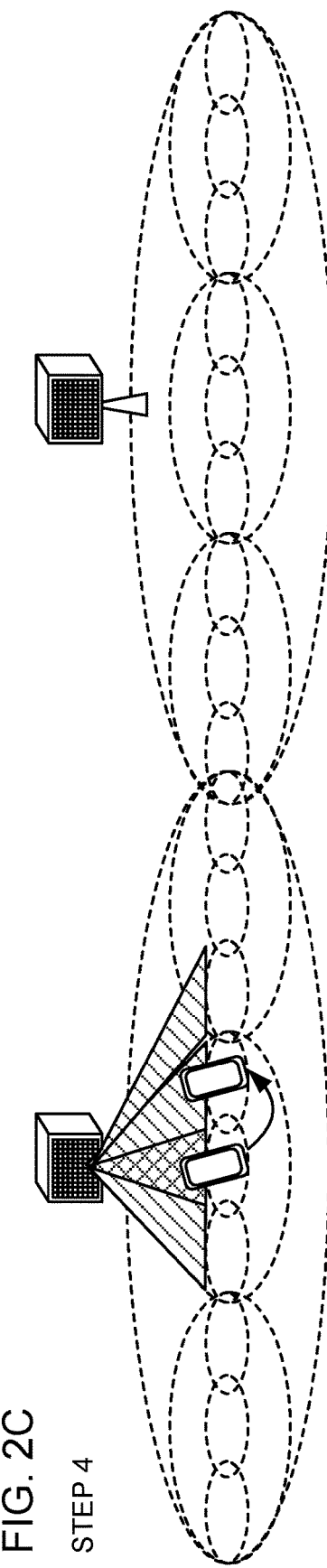
FIG. 2A STEP 2
FIG. 2B STEP 3
FIG. 2C STEP 4

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted to provide wide bands and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as 1 unit. Furthermore, in CA, a number of CCs under the same radio base station (referred to as an "eNB (evolved Node B)," a "BS (Base Station)," and so on) are configured in a user terminal (UE (User Equipment)).

Meanwhile, in LTE Rel. 12, dual connectivity (DC), in which multiple cell groups (CGs) formed with different radio base stations are configured in UE, is also introduced. Each cell group is comprised of at least 1 cell (CC). Given that multiple CCs under different radio base stations are integrated in DC, DC is also referred to as "inter-eNB CA."

Also, in LTE Rel. 8 to 12, frequency division duplex (FDD), in which downlink (DL) transmission and uplink (UL) transmission take place in different frequency bands, and time division duplex (TDD), in which downlink transmission and uplink transmission switch over time and take place in the same frequency band, are introduced.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.).

For example, 5G/NR is under study to provide radio communication services, referred to as "eMBB (enhanced Mobile Broad Band)," "mMTC (massive Machine Type Communication)," "URLLC (Ultra Reliable and Low Latency Communications)," and so on.

Now, regarding NR, research is underway to make use of RRM (Radio Resource Management) measurement for mobility control. However, how to configure RRM measurement has not yet been decided yet. Unless RRM measurement is conducted properly, communication throughput may be degraded.

The present invention has been made in view of the above, and it is therefore an object of the present invention to provide a user terminal and a radio communication method, whereby RRM measurement can be configured properly.

Solution to Problem

According to one aspect of the present invention, a user terminal has a receiving section that receives information about a parameter that is common among a plurality of resources for a reference signal and a control section that controls, based on information about the parameter, reporting of results of measurement using the reference signal in part of the plurality of resources, and information about measured resources.

Advantageous Effects of Invention

According to the present invention, RRM measurement can be configured properly.

BRIEF DESCRIPTION OF DRAWINGS

FIGS. 1A and 1B are diagrams to show examples of beams for mobility measurement;

FIGS. 2A to 2C are diagrams to show an example scenario of mobility measurement;

DESCRIPTION OF EMBODIMENTS

Figure 3:
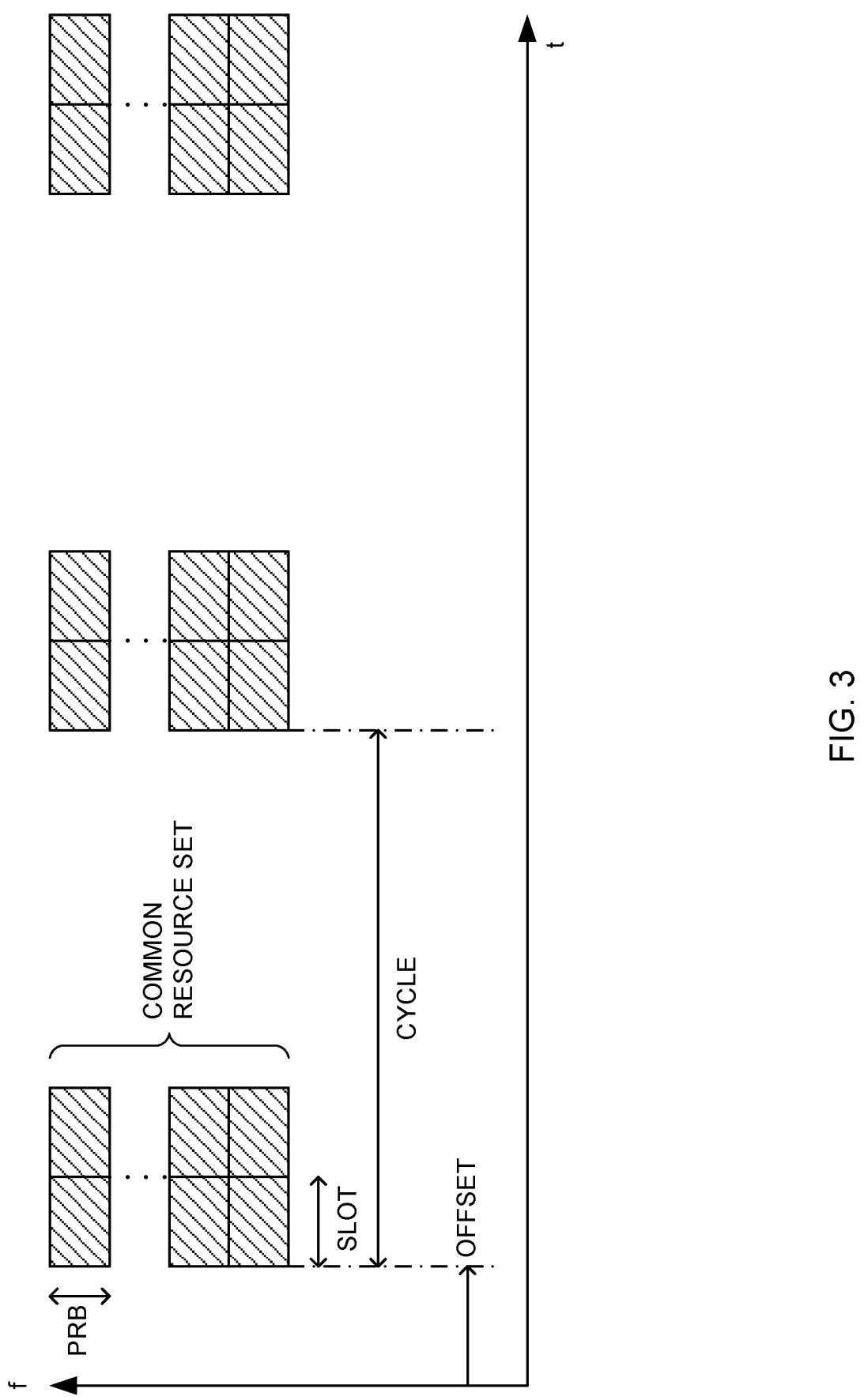
FIG. 3 is a diagram to show an example of CSI-RS resource configuration according to the first embodiment of the present invention.

First, an example of mobility control in LTE will be described. In LTE Rel. 11, coordinated multi-point transmission/reception (CoMP) technology is standardized to enable dynamic point selection (DPS), in which UE performs measurements and reporting based on channel state information reference signals (CSI-RSs), with respect to multiple transmission/reception points (TRPs), and switches the communicating TRP on a dynamic basis.

Note that a TRP is, for example, a base station, and may be simply referred to as a "transmission point (TP)," a "reception point (RP)," and/or the like.

In one example of the DPS procedure, UE first detects a cell based on synchronization signals (PSS (Primary Synchronization Signal)/SSS (Secondary Synchronization Signal)) and cell-specific reference signals (CRSs), and performs RRM (Radio Resource Management) measurement/reporting.

In RRM measurement/reporting, the UE may, for example, measure received power (for example, RSRP (Reference Signal Received Power)), and report information related to the received power. Note that "measurement/reporting" as used herein may be used interchangeably with "measurement and/or reporting."

Multiple CSI processes (up to 4 processes) for performing CSI measurement for each TRP are configured from the connecting cell to the UE. The UE measures/reports the CSI-RSs transmitted from each TRP, based on the configurations of the CSI processes, and the network switches, dynamically, the TRP to use for transmission and reception with the UE, based on the results reported (DPS).

In CSI, the UE may report CSI pertaining to at least one of a channel quality indicator (CQI), a precoding matrix indicator (PMI), a precoding-type indicator (PTI), a rank indicator (RI) and so on.

The network may find out the TRP with the highest received quality of signals in the UE, based on the measurement results reported from the UE, and use this TRP for transmission/reception with the UE.

In this way, by using multiple CSI processes, even when the UE moves within the same cell, communication with the network can be maintained by switching the TRP the UE communicates with, without switching the cell or reconfiguring the RRC (Radio Resource Control) information. Managing (maintaining) communication during movement not recognized by higher layers is also referred to as "layer 1/layer 2 mobility (L1/L2 mobility)."

Note that, when movement to cross cells occurs (for example, handover across cells), it is necessary to switch the connecting cell and reconfigure the RRC information because L1/L2 mobility cannot be maintained. Managing (maintaining) communication during movement recognized by higher layers is also referred to as "layer 3 mobility (L3 mobility)."

For mobility measurement in NR DL, studies are underway to support idle RS-based RRM measurement, in which an idle RS that are always "on" is used, in both idle mode and connected mode.

This idle RS may be, for example, the NR-SSS, or the NR-SSS and the DMRS (DeModulation Reference Signal) for the PBCH (Physical Broadcast Channel).

Also, for mobility measurement, studies are underway to support CSI-RS-based RRM measurement to use CSI-RS, only in connected mode. Other reference signals such as MRS (Mobility Reference Signal) and DMRS may be used, instead of CSI-RS.

In CSI-RS-based RRM measurement, the presence of nearby cells and the cell IDs are detected based on NR-SSs (Synchronization Signals). Higher layer signaling from the NW (network, including, for example, a radio base station) configures idle RS-based RRM measurement and/or CSI-RS-based RRM measurement in UE (User Equipment) in connected mode.

Use cases of CSI-RS-based RRM measurement that are under research include, for example, the following:

Improving the accuracy of measurements by cell-edge UEs by using CSI-RSs;

Similar to CoMP scenario 4, allowing UE to identify beams and/or TRPs (Transmission Reception Points) that use common PSS/SSS by using CSI-RSs;

Using CSI-RSs when the beam width of an NR-SS is very wide, and the granularity of the beam is not sufficient for later beam-level RSRP (Reference Signal Received Power) measurement for L1/L2 mobility;

Using wide-beam NR-SSs for high-mobility UEs and narrower-beam CSI-RSs for low-mobility UEs; and Measuring carriers that do not use initial access (for example, non-stand-alone carriers), by using CSI-RSs.

An example scenario of mobility measurement will be described below. FIGS. 1A and 1B are diagrams to show examples of beams for use in mobility measurement. FIGS. 2A to 2C are diagrams to show an example scenario of mobility measurement.

NR-SSs (NR-PSS/SSS) and PBCH use a very wide beam. This wide beam is, for example, 1 (omni-directional) beam that is directed towards the whole cell area, as shown in FIG. 1B.

The data and control signals use a very narrow beam. CSI-RSs for L1/L2 beam management also use a very narrow beam. This narrow beam is, for example, 1 of 9 beams BI #1 to BI #9, as shown in FIG. 1A. CSI-RS-based beam measurement results can provide suitable settings for L1/L2 beam managements. Meanwhile, the overhead and complexity of L1/L2 beam management procedures pose problems.

In this case, the CSI-RS-based RRM measurement may be tuned to a beam width between the beam width for the idle RS the and beam width for the data and control signals. This intermediate beam has, for example, a beam width that is approximately 3 times the narrow beam, as shown in FIG. 1A.

Referring to FIG. 1B (step 1), UE detects cells based on NR-PSSs/SSSs (wide beams) and reports cell-level RSRPs based on idle RSs. By this means, UE selects the cell to connect with.

In FIG. 2A (step 2), if CSI-RS-based RRM measurement is configured, the UE detects beams based on CSI-RSs (intermediate beams), and reports beam-level RSRPs (coarse beam-level RSRPs). Here, the UE reports the measurement results of top N beams among a number of intermediate beams. N is an integer of one or more.

In FIG. 2B (step 3), the UE is configured to measure the CSI-RSs of fine beams (fine beam-level RSRPs), which are suitable for L1/L2 beam management, via RRC signaling, based on the reports of coarse beam-level RSRPs, and report the results. For example, as shown in FIG. 2B, M fine beams near the top N intermediate beams reported in coarse beam-level RSRPs are configured in the UE. M is an integer of one or more. FIG. 2B shows the case where M is 4.

In FIG. 2C (step 4), UE measures and reports the CSI-RSs (fine beam-level RSRPs) of M fine beams, and the radio base station selects a proper beam for transmitting and receiving data (that is, for L1/L2 mobility), without RRC involvement.

Step 3 and step 4 may be for L1/L2 mobility. Based on the top N beam measurement results reported in step 2, the radio base station may configure M fine beams in the UE as beams being suitable for L1/L2 mobility. The UE may perform CSI measurement reporting for the M fine beams (fine beam-level RSRP reporting).

Figure 4:
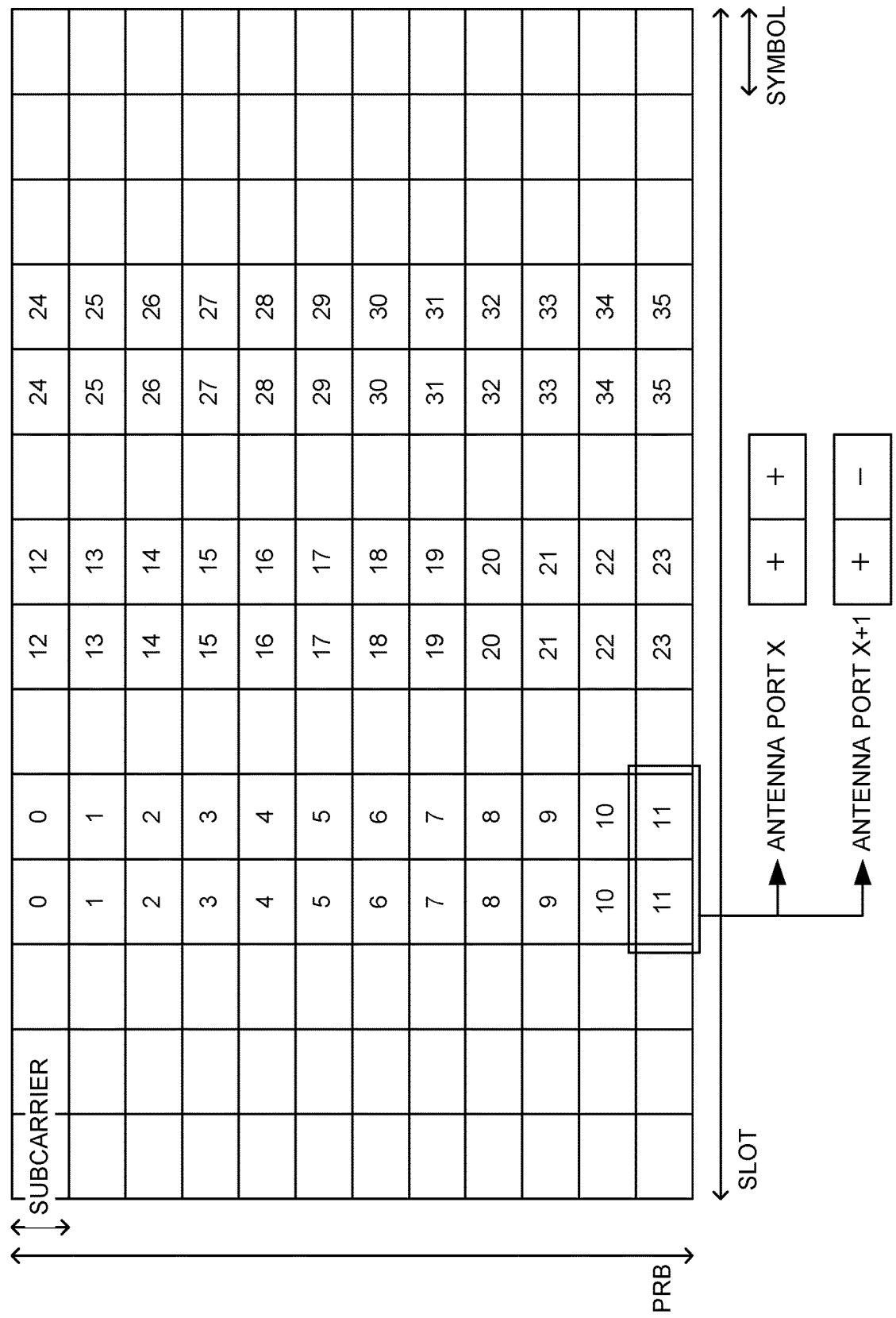
FIG. 4 is a diagram to show an example of common resource set configuration according to the first embodiment.

In FIG. 2C, 4 fine beams are configured via RRC signaling, so that cases might occur where, depending on the movement of the UE, other sets of fine beams may be re-configured by RRC signaling (that is, L3 mobility). This reconfiguration takes place based on coarse beam-level RSRPs reported using intermediate beams.

Although CSI-RSs are used in both coarse beam-level RSRP measurement and fine beam-level RSRP measurement, different types of configuration information may be reported in both. Coarse beam-level RSRP measurements may be referred to as "RRM measurement." Fine beam-level RSRP measurement may be referred to as "CSI measurement."

In LTE, RSRP measurement to use CSI-RSs has been supported since Rel. 12. This RSRP measurement requires explicit configuration information for each CSI-RS resource (up to 96 CSI-RS resources). For example, for every CSI-RS resource, a cell ID (PCID (Physical Cell Identifier)), a scrambling ID, a CSI-RS configuration index to show the resource for the CSI-RS, a subframe offset, and a CSI-RS-specific offset need to be indicated, in addition to a periodicity and a time offset (DMTC (Discovery Measurement Timing Configuration)). If explicit signaling of configurations as in LTE is applied to CSI-RS-based RRM measurement, the configuration information becomes very large.

So, the present inventors have come up with a method for realizing CSI-RS-based RRM measurement while reducing the overhead of setup and/or reporting.

To be more specific, NR supports common resource configuration information that applies a common configuration to multiple CSI-RSs for CSI-RS-based RRM measurement. Common resource configuration information includes at least one of information about a common resource set (for example, time/frequency resource pool), which is a set of resources that are available for use in RRM measurement, the periodicity of the common resource set, the time offset of the common resource set, and the antenna port assumed. The time/frequency resource pool shows multiple time and frequency resources for CSI-RS. The time/frequency resource pool may be referred to as the "pattern of time and frequency resources." The antenna port may be associated with orthogonal code for code division multiplexing (CDM).

The common resource configuration information may be common in frequency units (for example, in carrier units), may be common in cell units, or may be common in beam/TRP-group units. A beam/TRP group may be a group comprised of part of the beams and/or TRP in a cell, or may be a group of multiple beams and/or TRPs across cells.

UE performs CSI-RS-based RRM measurement based on the common resource configuration information. The UE reports the top N measurement results (for example, RSRPs) among the CSI-RS resources detected. N may be set forth in the specification in advance, or may be configured from the NW to the UE. N is smaller than the number of CSI-RS resources to be measured. Note that the UE may report the results fulfilling given conditions, among all of the measurement results.

If common resource configuration information alone is configured in the UE, it is necessary to report information that is associated with measurement results, in order to show which CSI-RS a measurement result that is reported corresponds to. The information associated with measurement results may be CSI-RS configuration indices that indicate the CSI-RS time/frequency resources that have been measured in the CSI-RS resource configuration, may be cells IDs and/or scrambling IDs that have been measured, and may be antenna port indices that indicate the antenna ports for the CSI-RSs that have been measured.

Now, embodiments of the present invention will be described in detail below with reference to the accompanying drawings. Note that the radio communication methods according to the herein-contained embodiments may be used individually or may be used in combination.

Note that, in the present specification, a transmission time interval (TTI) may be read as a given time unit (for example, a subframe, a slot, a minislot, a shortened TTI (sTTI), etc.). A TTI may be identified by a given index (for example, a subframe index, a slot index, a minislot index, an sTTI index, etc.). Note that a TTI may be referred to as a "long TTI," or may be referred to as a "short TTI."

Also, a "beam" may be read as a "resource," an "antenna port" and the like.

(Radio Communication Method)

First Embodiment

A case will be described below with the first embodiment of the present invention, in which a number of different beams are transmitted in 1 RB (Resource Block). Note that an RB may be a PRB (Physical Resource Block).

Different beams are transmitted in different time/frequency resources and/or different antenna ports. This allows UE to measure multiple beams within 1 PRB. "Time/frequency resources" may be interpreted as "time resources and/or frequency resources."

It is possible to assume that the present embodiment may be used together with digital BF or hybrid BF.

The NW configures common resource configuration for CSI-RS-based RRM measurement, in UE, via higher layer signaling. Higher layer signaling may be UE-common signaling (for example, SIB (System Information Block)) or may be UE-specific signaling (for example, RRC (Radio Resource Control) signaling).

A common resource set may assume a CSI-RS resource configuration for CSI-RS resources in units of given time duration and given bandwidth. For example, as shown in FIG. 3, a common resource set may be configures so that a CSI-RS resource configuration, which is comprised of 1-slot and 1-PRB units, repeats over multiple slots and/or multiple PRBs. In this case, information about the common resource set may show every how many slots the CSI-RS resource configuration is repeated, and/or every how many PRBs the CSI-RS resource configuration is repeated. As described above, by repeating a CSI-RS resource configuration, it is possible to improve the accuracy of measurement, while reducing the overhead of configuration.

Furthermore, a common resource set is allocated in accordance with the periodicity and time offset. The periodicity and time offset are configured in common for CSI-RSs in the resource set, so that the overhead of setup can be reduced compared to the method of configuring periodicity and time offset on a per CSI-RS basis.

A CSI-RS resource configuration shows CSI-RS resources in units of given time duration and given bandwidth. For example, as shown in FIG. 4, a CSI-RS resource configuration shows resources for multiple CSI-RSs in 1-slot and 1-PRB units. Each CSI-RS resource may include time/frequency resource information and antenna port information.

In this example, the CSI-RS resource configuration includes information about 36 time/frequency resources, and 2 antenna ports. In this example, the time/frequency resources for each CSI-RS are comprised of 2 symbols and 1 subcarrier. In each time/frequency resource, 2 CSI-RSs that are transmitted using 2 respective antenna ports are code-division-multiplexed using an orthogonal code (for example, OCC (Orthogonal Cover Code) that spans 2 symbols (sequence length 2)).

The CSI-RS resource configuration may show the locations of each CSI-RS's time/frequency resources in the time domain and the frequency domain. The locations in the time domain and the locations in the frequency domain may be represented by symbol indices and subcarrier indices, respectively. The CSI-RS resource configuration may include CSI-RS configuration indices (#0 to #35) for identifying the time/frequency resources of each CSI-RS.

The CSI-RS resource configuration may include antenna port indices (X and X+1) for identifying the antenna port of each CSI-RS.

Example 1A

UE measures all the CSI-RSs in the common resource set that is configured. Assuming the CSI-RS resource configuration of FIG. 4, the UE attempts to measure 36×2 beams, for every cell that is detected. Here, the UE may assume that the cell IDs detected based on an idle RS are the scrambling IDs of the CSI-RSs for RRM measurement. The UE uses these scrambling IDs to detect the CSI-RSs indicated in the CSI-RS resource configuration. This eliminates the need for reporting scrambling IDs, so that the overhead of setup can be reduced.

The UE reports top N measurement results and information indicating the CSI-RSs corresponding to these measurement results. The information to show the CSI-RSs may include CSI-RS configuration indices, cell IDs, and antenna port IDs. This allows the NW to know which CSI-RSs have been measured, without having to configure CSI-RSs individually.

Example 1B

In LTE, each CSI-RS configuration index is explicitly reported from the NW to the UE, so that only the CSI-RS configuration indices that have been measured and measurement results are subject to reporting. By contrast with this, according to example 1A, the NW does not report every CSI-RS configuration index to UE in an explicit manner, and therefore the measurement report needs to include the CSI-RS configuration indices that have been measured (time/frequency resources), cell IDs, and antenna port indices. Therefore, the overhead for reporting might increase.

As in example 1A, the radio base station configures common resource configuration information for CSI-RS-based RRM measurement in the UE, via higher layer signaling.

In addition, the radio base station configures CSI-RS-ID association information, which shows the combinations of CSI-RS resources, and their indicators (CSI-RS-ID), in the UE, through higher layer signaling. The higher layer signaling may be UE-common signaling (for example, SIB), or may be UE-specific signaling (for example, RRC signaling).

The CSI-RS-ID association information may include combinations of measurement-target CSI-RS configuration indices and measurement-target antenna port IDs. The CSI-RS-ID association information may further include measurement-target cell IDs, or measurement-target scrambling IDs.

For example, given CSI-RS-ID #0, CSI-RS resource configuration index #0, antenna port index #0 and scrambling ID #0 may be associated therewith. Also, for example, CSI-RS resource configuration index #0, antenna port index #0, scrambling ID #0, and cell ID #0 may be associated with CSI-RS-ID #0.

This allows a common cycles and time offset to be configured for CSI-RSs in a common resource set.

The UE may assume that the scrambling ID and the cell ID are always the same, based on indication information. This can reduce the volume of CSI-RS-ID association information. The indication information may be 1 bit in the common resource configuration information or the CSI-RS-ID association information.

The CSI-RS-ID association information may be based on the CSI-RS configuration and cell IDs of the serving cell and/or nearby cells. In this case, the CSI-RS IDs of the serving cell and nearby cells that may be received in the cell are targets of measurement by the UE in the cell. By this means, it is possible to configure CSI-RS-ID association information pertaining to proper measurement targets, in the UE, in the cell.

The UE measures CSI-RSs based on combinations of resources indicated in the CSI-RS-ID association information, among the resources in the common resource set. For example, if CSI-RS-ID association information shows part of the resources in the common resource set, the UE measures only the CSI-RSs indicated in the CSI-RS-ID association information. Also, for example, when CSI-RS-ID association information corresponding to cell IDs is configured in the UE, the UE measures the CSI-RSs corresponding to cell IDs that are detected based on an idle RS. By this means, the UE can narrow down measurement targets, and reduce the load of measurement compared to example 1A.

The UE may report the top N measurement results and the CSI-RS-IDs corresponding to these measurement results. If CSI-RS-IDs are not associated with cell IDs, the UE reports top N measurement results, the CSI-RS-IDs corresponding to these measurement results, and the cell IDs corresponding to these measurement results.

When a CSI-RS resource configuration index, an antenna port index, a scrambling ID and/or a cell ID are combined, an index may be assigned as a proper CSI-RS-ID, so that the bit size of the CSI-RS-ID is smaller than the sum of the bit size of the CSI-RS resource configuration index, the bit size of the antenna port index, the bit size of the scrambling ID and/or the bit size of the cell ID. This reduces the overhead of reporting compared to example 1A.

Example 1C

According to example 1A and example 1B, even if only a few CSI-RS beams are directed (beam-formed) towards UE, the UE needs to measure all the CSI-RSs that can be measured, or measure all the CSI-RSs that are configured. If the UE can focus on the beams of some CSI-RSs among all of the configured CSI-RSs, so that the complexity of measurement by the UE can be reduced. The NR-SSS (or the NR-SSS and the DMRS for the PBCH) may be used to select the CSI-RS beams to be measured.

Similar to example 1A and example 1B, the radio base station configures the common resource configuration information for CSI-RS-based RRM measurement, in the UE, via higher layer signaling.

Similar to example 1B, the radio base station configures CSI-RS-ID association information, in the UE, through higher layer signaling.

For example, CSI-RS-IDs may be associated with the directions of beams or the areas covered by beams. The UE measures beam-formed idle RS and reports its measurement result. Based on this measurement result, the radio base station identifies the position of the UE or a beam suitable for the UE, determines a set of CSI-RS-IDs to be measured, which is suitable for the UE, and configures and/or updates the set of CSI-RS-IDs in the UE via UE-specific RRC signaling.

The UE measures the CSI-RSs associated with the configured CSI-RS-IDs, in the common resource set that is configured. By this means, compared to example 1A and example 1B, the UE can limit the CSI-RS to be measured, and reduce the burden of measurement.

The UE reports top N measurement results and the CSI-RS-IDs corresponding to these measurement results. If CSI-RS-IDs are not associated with cell IDs, the UE reports top N measurement results, the CSI-RS-IDs corresponding to these measurement results, and the cell IDs corresponding to these measurement results. This can reduce the overhead of reporting compared to example 1A.

Example 1D

In example 1D, the UE narrows down the CSI-RS-IDs.

Similar to example 1A to example 1C, the radio base station configures common resource configuration information for CSI-RS-based RRM measurement, in the UE, via higher layer signaling.

Similar to example 1B and example 1C, the radio base station configures CSI-RS-ID association information, in the UE, through higher layer signaling.

The radio base station further configures, in the UE, information about the associations (for example, QCL (Quasi-Co-Location)) between SS (synchronization signal) block indices and CSI-RS-IDs, via higher layer signaling.

An SS block is a resource (or a resource set) that contains at least one of NR-PSS, NR-SSS, and PBCH. For example, the UE may assume that NR-PSS, NR-SSS and PBCH received in SS blocks corresponding to the same SS block index are transmitted using the same beam. The UE can detect an SS block index from the signal in the SS block.

QCL indicates that the pseudo geographical relationship is the same. Considering the geographical position of each transmission point (channel characteristics of downlink signal transmitted from each transmission point), it is assumed that the case where long-term channel characteristics are the same between different antenna ports (APs) corresponds to QCL.

Figure 5:
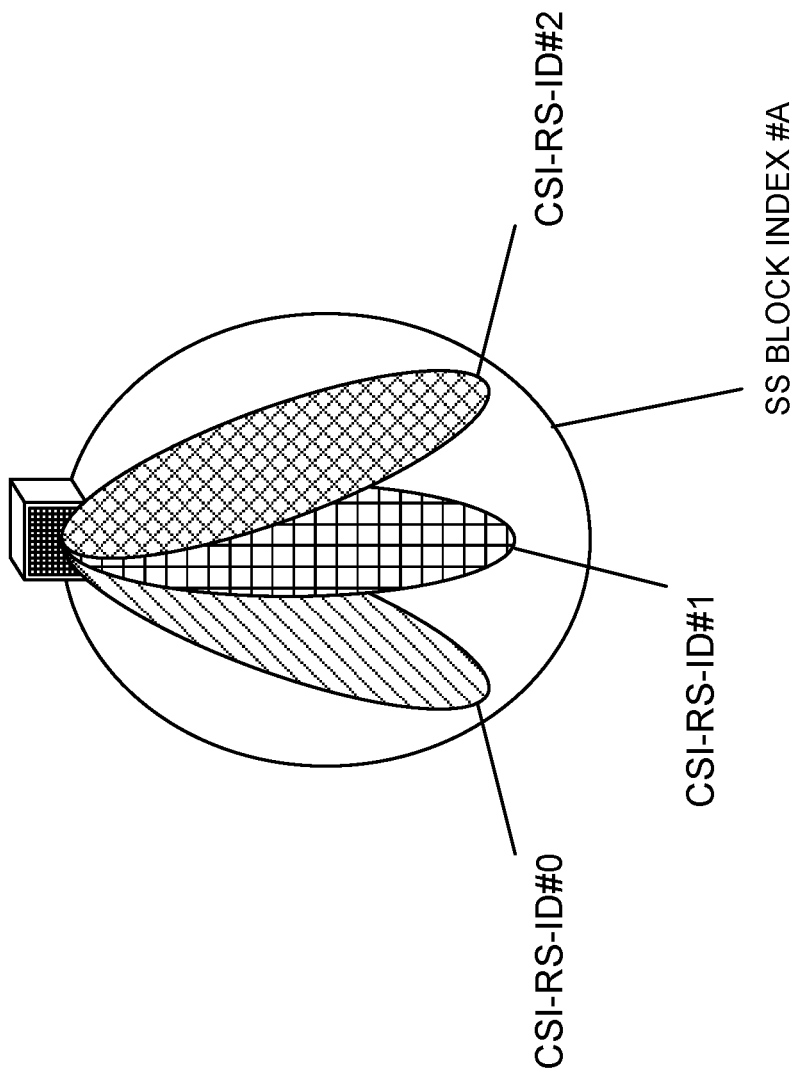
FIG. 5 is a diagram to show an example of the association between SS block indices and CSI-RS-IDs.

For example, as shown in FIG. 5, SS block index #A is associated with CSI-RS-IDs #0, #1 and #2. In this case, a QCL relationship is established among CSI-RS-IDs #0, #1 and #2. In this way, when the UE detects SS block index #A alone, the UE can limit the measurement target to CSI-RS-IDs #0, #1 and #2.

Note that 1 CSI-RS configuration index may be assigned 1 CSI-RS-ID, and 1 CSI-RS-ID may be assigned a different antenna port index.

The higher layer signaling may be UE-common signaling (for example, SIBs), or may be UE-specific signaling (for example, RRC signaling).

The UE measures a beam-formed idle RS and reports its measurement result. The UE measures the CSI-RSs associated with the SS block indices detected using the idle RS, in the common resource set that is configured. By this means, the UE can autonomously determine the CSI-RSs to be measured based on the detection result of the idle RS, and, compared to example 1A and example 1B, the CSI-RSs to be measured can be limited, so that the burden of measurement can be reduced.

The UE reports top N measurement results and the CSI-RS-IDs corresponding to these measurement results. If CSI-RS-IDs are not associated with cell IDs, the UE reports top N measurement results, the CSI-RS-IDs corresponding to these measurement results, and the cell IDs corresponding to these measurement results. This can reduce the overhead of reporting compared to example 1A.

Second Embodiment

With a second embodiment of the present invention, a case will be described below in which multiple different beams are time-division-multiplexed (TDM) on different time resources. The time resources are, for example, symbols and/or slots.

It may be assumed that the present embodiment is used with analog BF.

The radio base station configures common resource configuration information for CSI-RS-based RRM measurement, in UE, via higher layer signaling. The higher layer signaling may be UE-common signaling (for example, SIB), or may be UE-specific signaling (for example, RRC signaling).

Figure 6:
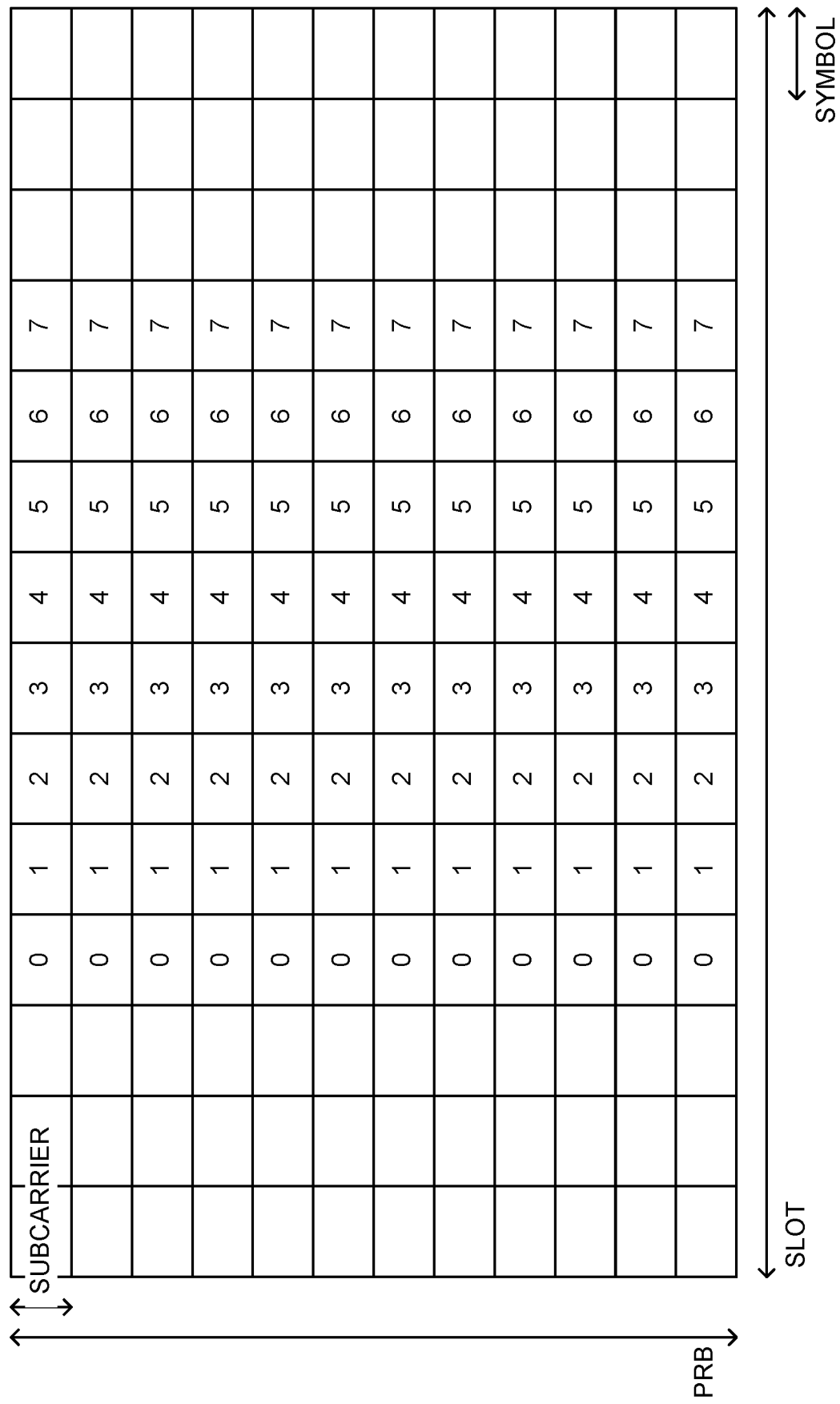
FIG. 6 is a diagram to show an example of CSI-RS resource configuration according to a second embodiment of the present invention.

The common resource set may be a CSI-RS resource configuration over 1 slot and 1 PRB, as shown in FIG. 6. The CSI-RS resource configuration may show the time unit indices of time resources (time units) for transmitting CSI-RSs.

In this example, the time units are symbols. The time unit indices and the frequency unit indices may be associated with beam IDs, which indicate the beams of CSI-RSs transmitted in corresponding symbols. Note that the time units may be slots. Common resource configuration information can reduce the overhead of setup.

The UE measures CSI-RSs in the common resource set configured, and reports top N measurement results and information associated with the CSI-RSs corresponding to the measurement results.

Example 2A

Similar to example 1A, UE measures all the CSI-RSs in a common resource set. The UE may assume that a scrambling ID is a detected cell ID. This can reduce the overhead of setup.

In example 2A, the UE reports measurement results, the time unit indices corresponding to these measurement results, and the cell IDs corresponding to these measurement results. This allows the UE to indicate CSI-RSs that correspond to measurement results, in the common resource set.

Example 2B

Similar to example 1B, the radio base station configures CSI-RS-ID association information, in the UE.

In example 2B, the radio base station configures the associations between CSI-RS-IDs and time unit indices, in the UE. The CSI-RS-IDs may be associated with scrambling IDs. The UE measures the CSI-RSs indicated in the configured CSI-RS-ID association information.

The UE may report the top N measurement results and the CSI-RS-IDs corresponding to these measurement results. This can reduce the overhead of reporting compared to example 2A.

Example 2C

Similar to example 1C, the radio base station selects the CSI-RS-IDs to measure, based on the measurement results of SSs by UE, and configures and/or updates the measurement-target CSI-RS-IDs for the UE.

The UE measures the CSI-RSs associated with the CSI-RS-IDs that are configured. By this means, it is possible to limit the CSI-RSs to measure compared to example 2A and example 2B, so that the burden of measurement by the UE can be reduced.

The UE may report the top N measurement results and the CSI-RS-IDs corresponding to these measurement results. This can reduce the overhead of reporting compared to example 2A.

Example 2D

Similar to example 1D, the radio base station configures the associations between CSI-RS-IDs and SS block indices.

The UE measures the CSI-RSs associated with the SS block indices detected using the idle RS, in the common resource set that is configured. By this means, the UE can select measurement targets autonomously. Also, since the CSI-RSs to be measured can be limited compared to example 2A and example 2B, so that the burden of measurement can be reduced.

The UE may report the top N measurement results and the CSI-RS-IDs corresponding to these measurement results. This can reduce the overhead of reporting compared to example 2A.

Example 2E

The scrambling IDs may be defined in association with cell IDs and beam IDs, which indicate CSI-RS beams (or time unit indices).

The radio base station configures the scrambling IDs for the CSI-RSs to be measured. The UE measures the CSI-RSs associated with the configured scrambling IDs, in the common resource set that is configured. By this means, it is possible to limit the CSI-RSs to measure compared to example 2A and example 2B, so that the burden of measurement by the UE can be reduced.

The UE reports the top N measurement results and the scrambling IDs corresponding to these measurement results. By this means, the radio base station can determine which measurement result corresponds to which beam of which cell, from the scrambling IDs reported. When the number of beams is not much—that is, approximately the number of time unit indices or so—the number of scrambling IDs is not much either, so that the overhead of reporting can be reduced.

Third Embodiment

With a third embodiment of the present invention, a case will be described below in which multiple different beams are frequency-division-multiplexed (FDM) on different PRBs. FDM may assume interlace configurations, or assume comb (comb-shaped) configurations. For example, the same beam may be allocated to a number of PRBs at intervals, and other beams may be allocated to the PRBs in-between.

The radio base station configures common resource configuration information for CSI-RS-based RRM measurement, in UE, via higher layer signaling. The higher layer signaling may be UE-common signaling (for example, SIB), or may be UE-specific signaling (for example, RRC signaling).

Figure 7:
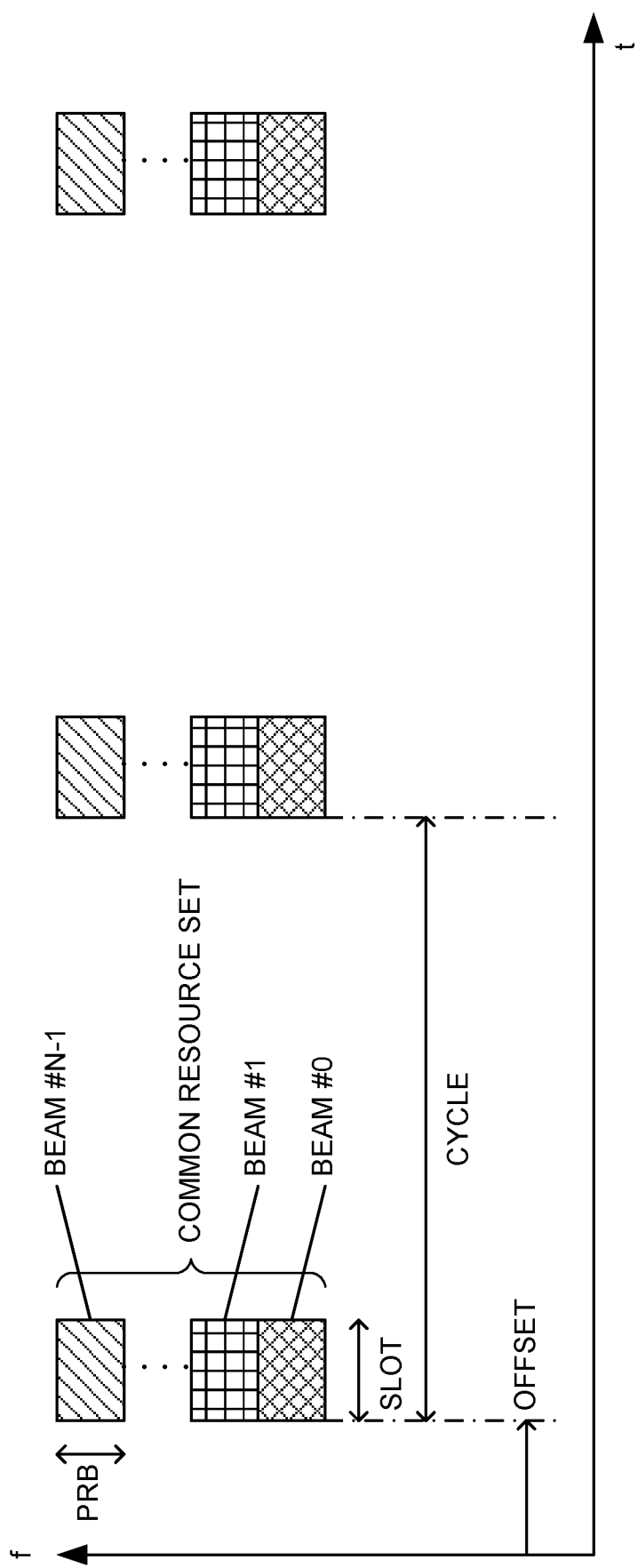
FIG. 7 is a diagram to show an example of common resource set configuration according to a third embodiment of the present invention.

As shown in FIG. 7, the common resource set may show the frequency unit indices of frequency resources (frequency units) for transmitting CSI-RSs. In this example, the frequency unit indices represent PRBs. The frequency unit indices may be associated with beam IDs, which indicate the beams of CSI-RSs transmitted in corresponding PRBs. Note that the frequency units may be carriers. Common resource configuration information can reduce the overhead of setup.

The common resource set may be a CSI-RS resource configuration that shows the time/frequency resources for CSI-RSs in 1 slot and 1 PRB.

The UE measures CSI-RSs in the common resource set configured, and reports top N measurement results and information associated with the CSI-RSs corresponding to the measurement results.

Example 3A

Similar to example 1A, UE measures all the CSI-RSs in a common resource set. The UE may assume that a scrambling ID is a detected cell ID. This can reduce the overhead of setup.

In example 3A, the UE reports measurement results, the time unit indices and frequency unit indices of the CSI-RSs corresponding to these measurement results and the cell IDs corresponding to these measurement results. This allows the UE to indicate CSI-RSs that correspond to measurement results, in the common resource set.

Example 3B

Similar to example 1B, the radio base station configures CSI-RS-ID association information, in the UE.

In example 3B, the radio base station configures the associations between CSI-RS-IDs and frequency unit indices, in the UE. The CSI-RS-IDs may be associated with scrambling IDs. The UE measures the CSI-RSs indicated in the configured CSI-RS-ID association information.

The UE may report the top N measurement results and the CSI-RS-IDs corresponding to these measurement results. This can reduce the overhead of reporting compared to example 3A.

Example 3C

Similar to example 1C, the radio base station selects the CSI-RS-IDs to measure, based on the measurement results of SSs by UE, and configures and/or updates the measurement-target CSI-RS-IDs for the UE.

The UE measures the CSI-RSs associated with the CSI-RS-IDs that are configured. By this means, it is possible to limit the CSI-RSs to measure compared to example 3A and example 3B, so that the burden of measurement by the UE can be reduced.

The UE may report the top N measurement results and the CSI-RS-IDs corresponding to these measurement results. This can reduce the overhead of reporting compared to example 3A.

Example 3D

Similar to example 1D, the radio base station configures the associations between CSI-RS-IDs and SS block indices.

The UE measures the CSI-RSs associated with the SS block indices detected using the idle RS, in the common resource set that is configured. By this means, the UE can select measurement targets autonomously. Also, since the CSI-RSs to be measured can be limited compared to example 3A and example 3B, the burden of measurement can be reduced.

The UE may report the top N measurement results and the CSI-RS-IDs corresponding to these measurement results. This can reduce the overhead of reporting compared to example 3A.

Example 3E

As in example 2E, the scrambling IDs may be defined in association with beam IDs, which indicate CSI-RS beams (or in association with frequency unit indices).

The radio base station configures the scrambling IDs for the CSI-RSs to be measured. The UE measures the CSI-RSs associated with the configured scrambling IDs, in the common resource set that is configured. By this means, it is possible to limit the CSI-RSs to measure compared to example 2A and example 2B, so that the burden of measurement by the UE can be reduced.

The UE reports the top N measurement results and the scrambling IDs corresponding to these measurement results. By this means, the radio base station can determine which measurement result corresponds to which beam of which cell, from the scrambling IDs reported. When the number of beams is not much—that is, approximately the number of frequency unit indices or so—the number of scrambling IDs is not much either, so that the overhead of reporting can be reduced.

Fourth Embodiment

With a fourth embodiment of the present invention, a case will be described below in which a number of different beams are transmitted in different PRBs and different symbols or slots. That is, different beams are multiplexed using FDM and TDM in combination.

The radio base station configures common resource configuration information for CSI-RS-based RRM measurement, in UE, via higher layer signaling. The higher layer signaling may be UE-common signaling (for example, SIB), or may be UE-specific signaling (for example, RRC signaling).

Figure 8:
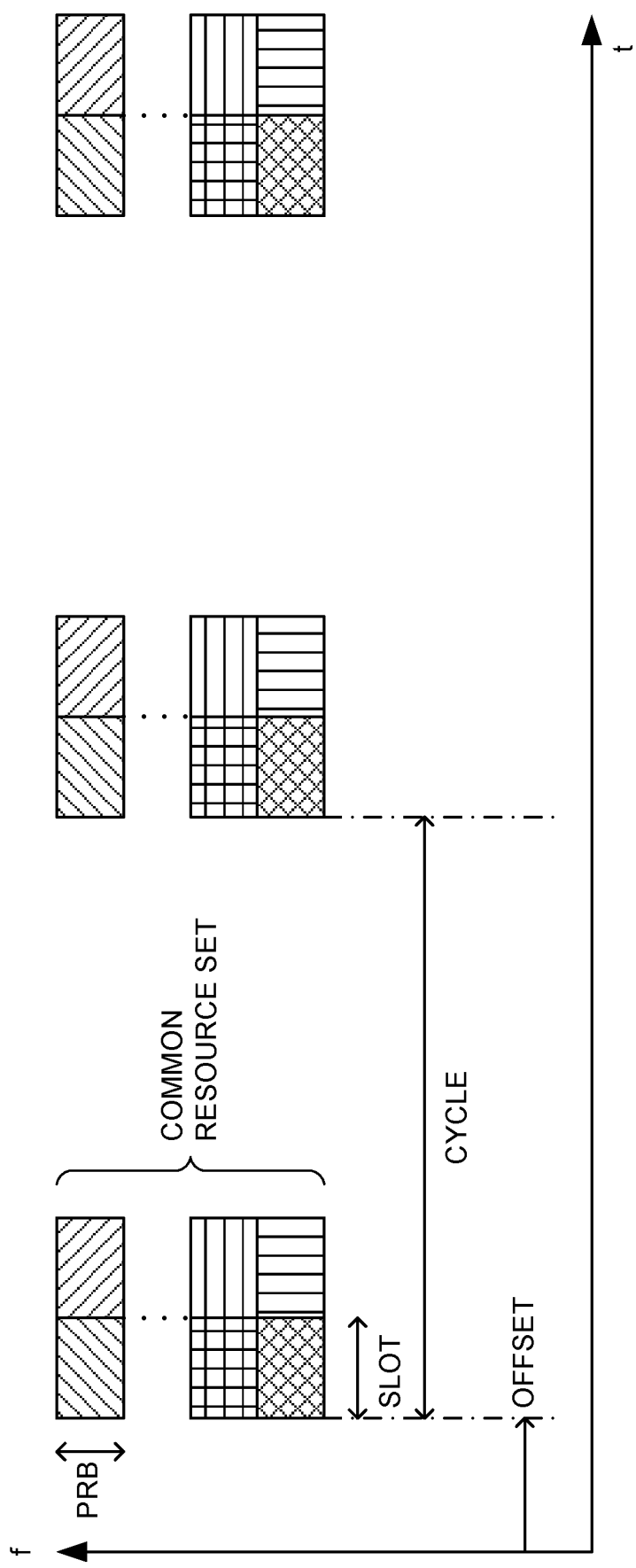
FIG. 8 is a diagram to show an example of common resource set configuration according to a fourth embodiment of the present invention.

As shown in FIG. 8, the common resource set may show the time unit indices of time resources (time units) an the frequency unit indices of frequency resources (frequency units) for transmitting CSI-RSs. In this example, the time units represent slots, and the frequency unit indices represent PRBs. The time unit indices and the frequency unit indices may be associated with beam IDs, which indicate the beams of CSI-RSs transmitted in corresponding time units and frequency units. Note that the time units may be slots. The frequency units may be carriers. The overhead of setup can be reduced by using common resource configuration information.

The common resource set may be a CSI-RS resource configuration that shows the time/frequency resources for CSI-RSs in 1 slot and 1 PRB.

The UE measures CSI-RSs in the common resource set configured, and reports top N measurement results and information associated with the CSI-RSs corresponding to the measurement results.

Example 4A

Similar to example 1A, UE measures all the CSI-RSs in a common resource set. The UE may assume that a scrambling ID is a detected cell ID. This can reduce the overhead of setup.

In example 4A, the UE reports measurement results, the time unit indices and frequency unit indices of the CSI-RSs corresponding to these measurement results and the cell IDs corresponding to these measurement results. This allows the UE to indicate CSI-RSs that correspond to measurement results, in the common resource set.

Example 4B

Similar to example 1B, the radio base station configures CSI-RS-ID association information, in the UE.

In example 4B, the radio base station configures the associations between CSI-RS-IDs, time unit indices and frequency unit indices, in the UE. The CSI-RS-IDs may be associated with scrambling IDs. The UE measures the CSI-RSs indicated in the configured CSI-RS-ID association information.

The UE may report the top N measurement results and the CSI-RS-IDs corresponding to these measurement results. This can reduce the overhead of reporting compared to example 4A.

Example 4C

Similar to example 1C, the radio base station selects the CSI-RS-IDs to measure, based on the measurement results of SSs by UE, and configures and/or updates the measurement-target CSI-RS-IDs for the UE.

The UE measures the CSI-RSs associated with the CSI-RS-IDs that are configured. By this means, it is possible to limit the CSI-RSs to measure compared to example 4A and example 4B, so that the burden of measurement by the UE can be reduced.

The UE may report the top N measurement results and the CSI-RS-IDs corresponding to these measurement results. This can reduce the overhead of reporting compared to example 4A.

Example 4D

Similar to example 1D, the radio base station configures the associations between CSI-RS-IDs and SS block indices.

The UE measures the CSI-RSs associated with the SS block indices detected using the idle RS, in the common resource set that is configured. By this means, the UE can select measurement targets autonomously. Also, since the CSI-RSs to be measured can be limited compared to example 4A and example 4B, so that the burden of measurement can be reduced.

The UE may report the top N measurement results and the CSI-RS-IDs corresponding to these measurement results. This can reduce the overhead of reporting compared to example 4A.

Example 4E

As in example 2E, the scrambling IDs may be defined in association with cell IDs and beam IDs, which indicate CSI-RS beams (or in association with time unit indices and frequency unit indices).

The radio base station configures the scrambling IDs for the CSI-RSs to be measured. The UE measures the CSI-RSs associated with the configured scrambling IDs, in the common resource set that is configured. By this means, it is possible to limit the CSI-RSs to measure compared to example 4A and example 4B, so that the burden of measurement by the UE can be reduced.

The UE reports the top N measurement results and the scrambling IDs corresponding to these measurement results. By this means, the radio base station can determine which measurement result corresponds to which beam of which cell, from the scrambling IDs reported. When the number of beams is not much—that is, approximately the number of combinations of time unit indices and frequency unit indices or so—the number of scrambling IDs is not much either, so that the overhead of reporting can be reduced.

<Variations>

CSI-RS-IDs may be indexed per cell, or may be indexed per carrier. In addition, when CSI-RS-IDs are used in common between frequencies, indexing may be done so that the CSI-RS-ID of a certain cell and the CSI-RS-IDs of its neighboring cells do not overlap.

Also, event triggers based on CSI-RS-based RRM measurement may be defined apart from event triggers based on NR-SSS (or the DMRS for NR-SSS and PBCH).

An aperiodic (triggering) mechanism may be used, in which the UE requests transmission of CSI-RS for CSI-RS-based RRM measurement. For example, if the result of L1/L2 beam measurement (CSI measurement) of all configured beams is not good, the UE may request transmission of aperiodic CSI-RS for L3 RRM measurement (CSI-RS-based RRM measurement) to re-configure the CSI-RS set for L1/L2 beam measurement procedures. Also, one of UCI (Uplink Control Information), a MAC-CE (Media Access Control-Control Element), a specific PRACH (Physical Random Access Channel) and a specific SRS (Sounding Reference Signal) may be used as the trigger (request) mechanism for aperiodic CSI-RS transmission.

(Radio Communication System)

Now, the structure of the radio communication system according to one embodiment of the present invention will be described below. In this radio communication system, communication is performed using 1 or a combination of the radio communication methods according to the herein-contained embodiments of the present invention.

Figure 9:
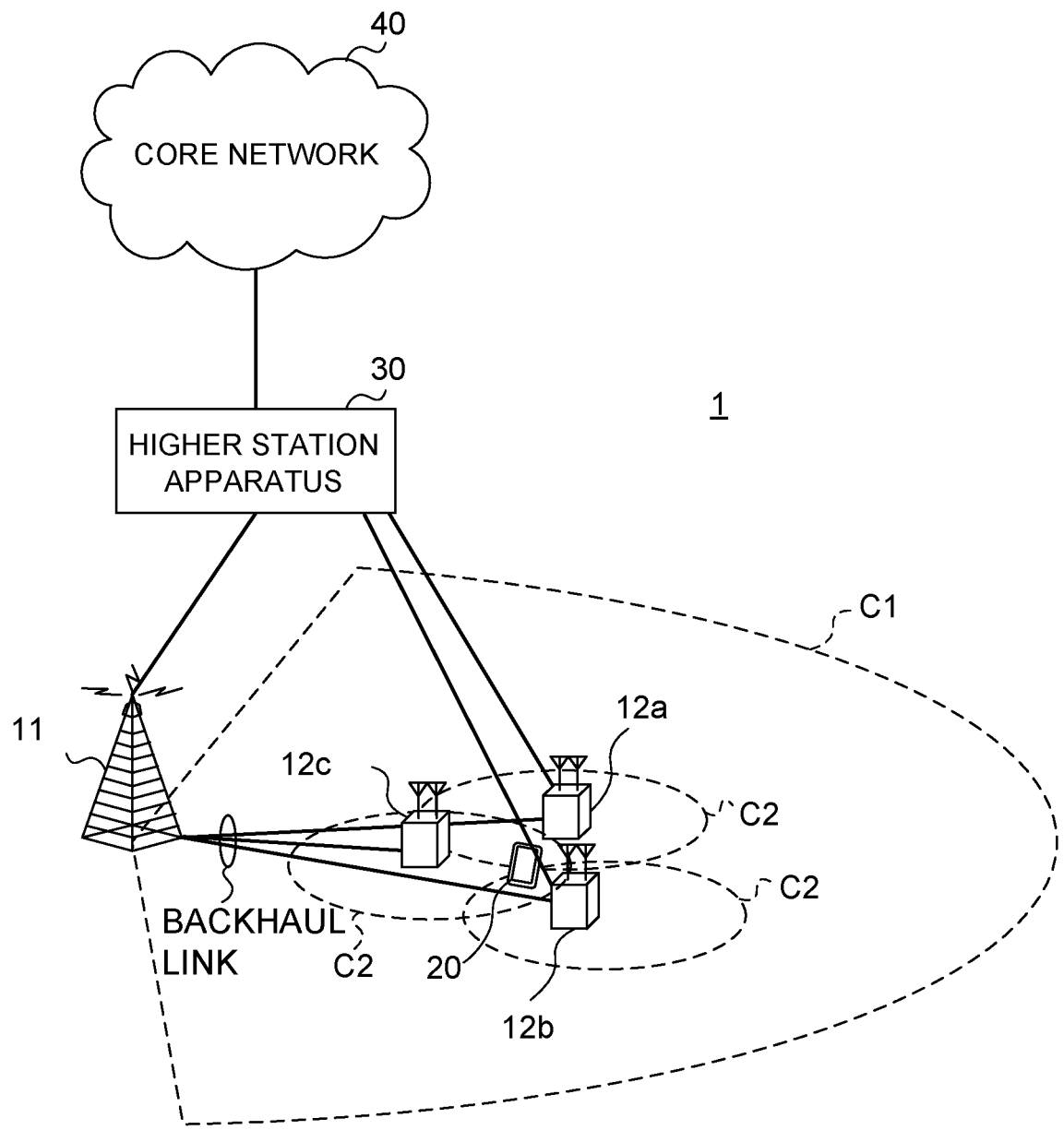
FIG. 9 is a diagram to show an exemplary schematic structure of a radio communication system according to one embodiment of the present invention.

FIG. 9 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into 1, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th Generation mobile communication system)," "5G (5th Generation mobile communication system)," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings. For example, each cell may be formed by multiple transmission/reception points (TRPs), and the radio base station 11 and/or the radio base station 12 may control one or more TRPs.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a number of cells (CCs) (for example, 5 or fewer CCs or 6 or more CCs).

Between the user terminals 20 and the radio base station 11, communication can be carried out using a carrier of a relatively low frequency bandwidth (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency bandwidth (for example, 3.5 GHz, 5 GHz and so on) and a wide bandwidth may be used, or the same carrier as that used in the radio base station 11 may be used. Note that the structure of the frequency bandwidth for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with 1 or contiguous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) (including, for example, PDSCH and/or PUSCH scheduling information) and the like are communicated in the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication systems 1, the cell-specific reference signal (CRS (Cell-specific Reference Signal)), the channel state information reference signal (CSI-RS (Channel State Information-Reference Signal)), the demodulation reference signal (DMRS (DeModulation Reference Signal)), the positioning reference signal (PRS (Positioning Reference Signal)) and so on are communicated as downlink reference signals. Also, in the radio communication system 1, the measurement reference signal (SRS (Sounding Reference Signal)), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 10:
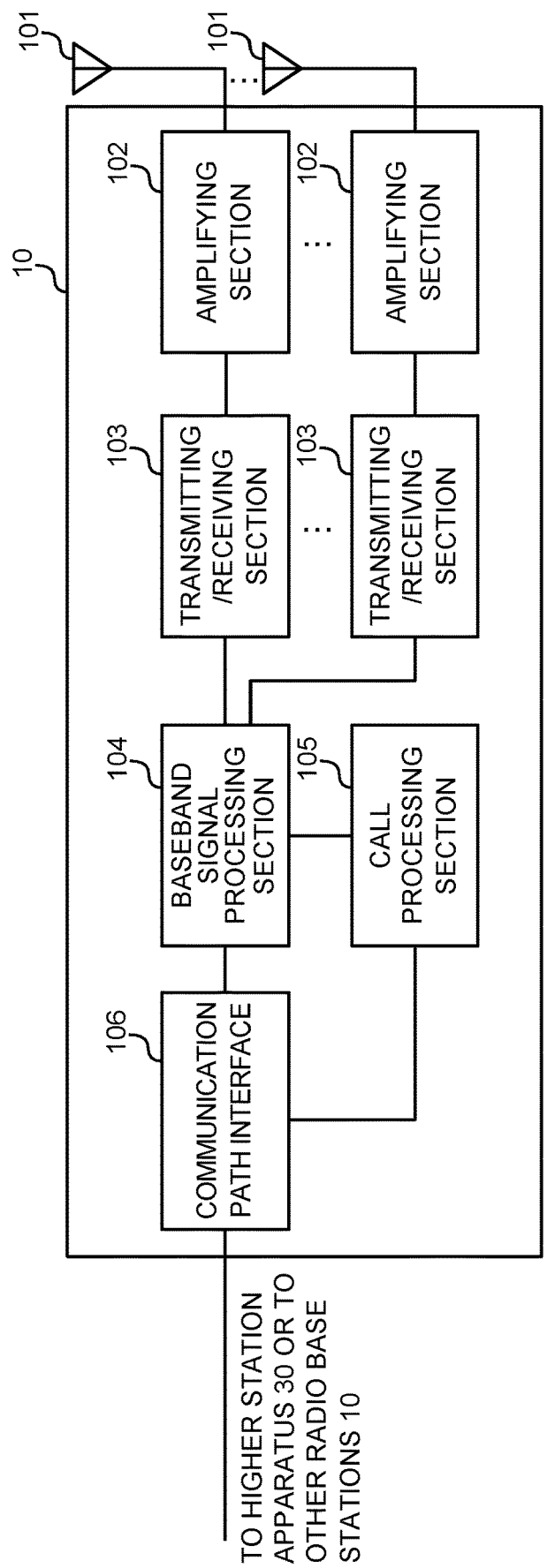
FIG. 10 is a diagram to show an exemplary overall structure of a radio base station according to one embodiment of the present invention.

FIG. 10 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas.

Also, the transmitting/receiving sections 103 may transmit RSs (for example, an idle RS) in idle mode. The transmitting/receiving sections 103 may transmit reference signals (for example, CSI-RS) in connected mode.

Also, the transmitting/receiving sections 103 may transmit, to the user terminal 20, information (for example, common resource configuration information) about parameters that apply in common to multiple resources (for example, time/frequency resources, antenna ports, etc.) for reference signals.

Also, the transmitting/receiving sections 103 may receive, from the user terminal 20, a report that includes measurement results (for example, measurement values in CSI-RS-based RRM measurement) using reference signals in part of the resources, and information about the measured resources. The information about the measured resources may be information associated with the measurement results. Assuming that a CSI-RS has been measured, this information may contain one of the CSI-RS configuration index, the cell ID, the scrambling ID, the antenna port index and the CSI-RS-ID of this CSI-RS.

Also, the transmitting/receiving sections 103 may receive, from the user terminal 20, a report that includes measurement results that fulfil a given condition (for example, the top N measurement values) among the measurement results, and information about the resources corresponding to the results fulfilling a given condition. Assuming that a resource corresponds to a result fulfilling a given condition, the information about this resource may contain one of the CSI-RS configuration index corresponding to the measurement value, the antenna port index, the cell ID, the scrambling ID and the CSI-RS-ID.

Also, the transmitting/receiving sections 103 may transmit, to the user terminal 20, information (for example, CSI-RS-ID association information) about the association between one of a number of resources, and an indicator (for example, CSI-RS-ID).

Also, the transmitting/receiving sections 103 may transmit, to the user terminal 20, an indicator based on the result of measurement using a given signal (for example, idle RS) (for example, the CSI-RS-ID associated with a beam selected based on the measurement result of a given signal) by the user terminal 20.

Also, the transmitting/receiving sections 103 may transmit, to the user terminal 20, information about the associations (for example, QCL) between resources for a given signal (for example, SS block indices) and indicators (for example, CSI-RS-IDs).

Figure 11:
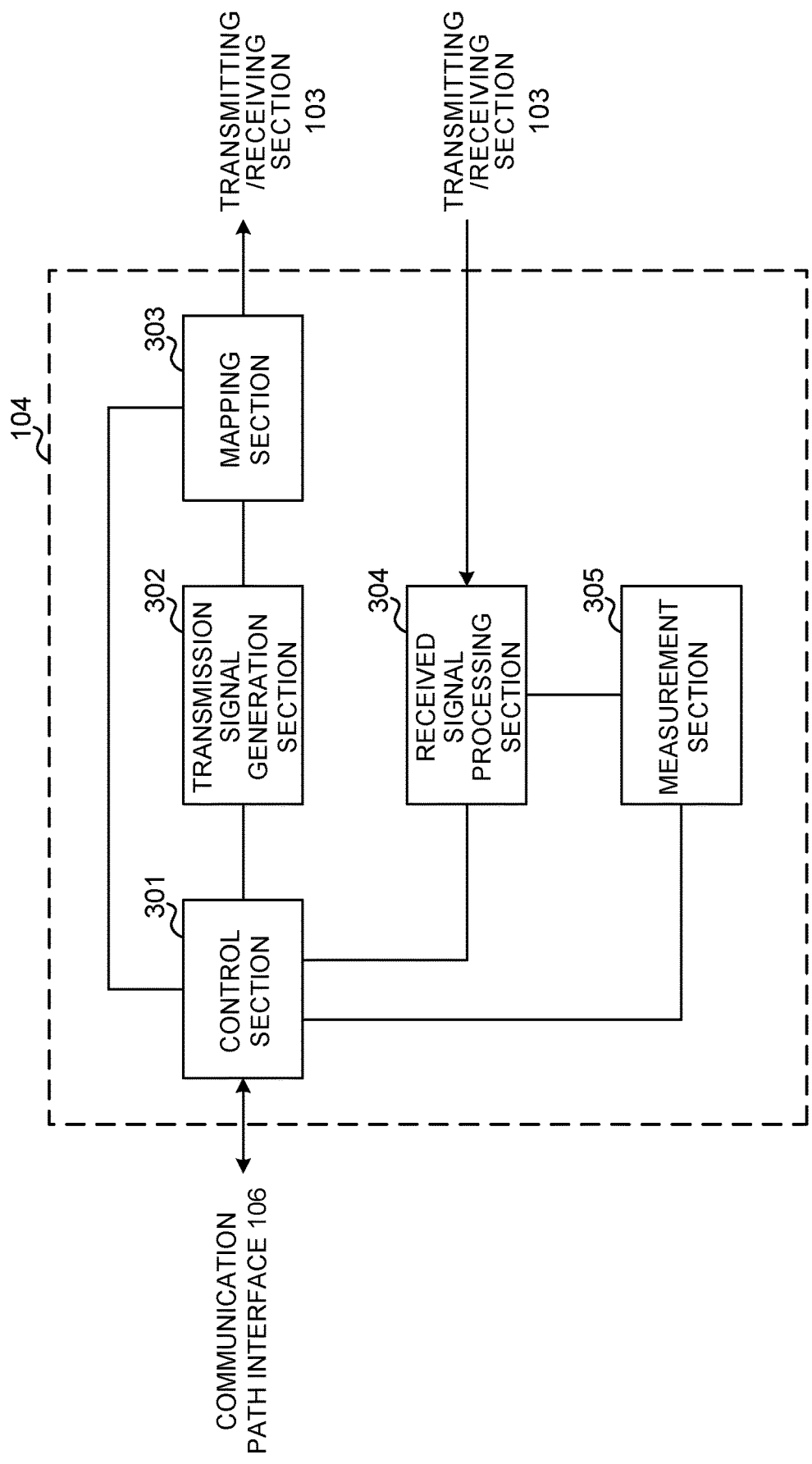
FIG. 11 is a diagram to show an exemplary functional structure of a radio base station according to one embodiment of the present invention.

FIG. 11 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 may exert control so that transmitting beams and/or receiving beams are formed using digital BF (for example, precoding) in the baseband signal processing section 104 and/or analog BF (for example, phase rotation) in the transmitting/receiving sections 103. The control section 301 may exert control so that beams are formed based on downlink propagation path information, uplink propagation path information and so on. These pieces of propagation path information may be obtained from the received signal processing section 304 and/or the measurement section 305. Note that transmission using transmitting beams may be paraphrased as signal transmission to which a given precoding is applied.

Furthermore, the control section 301 may select the indicators to transmit to the user terminal 20 based on the results of measurement by the user terminal 20 using a given signal. For example, the control section 301 may select a beam based on the measurement result of a given signal, and select the CSI-RS-ID associated with that beam.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

(User Terminal)

Figure 12:
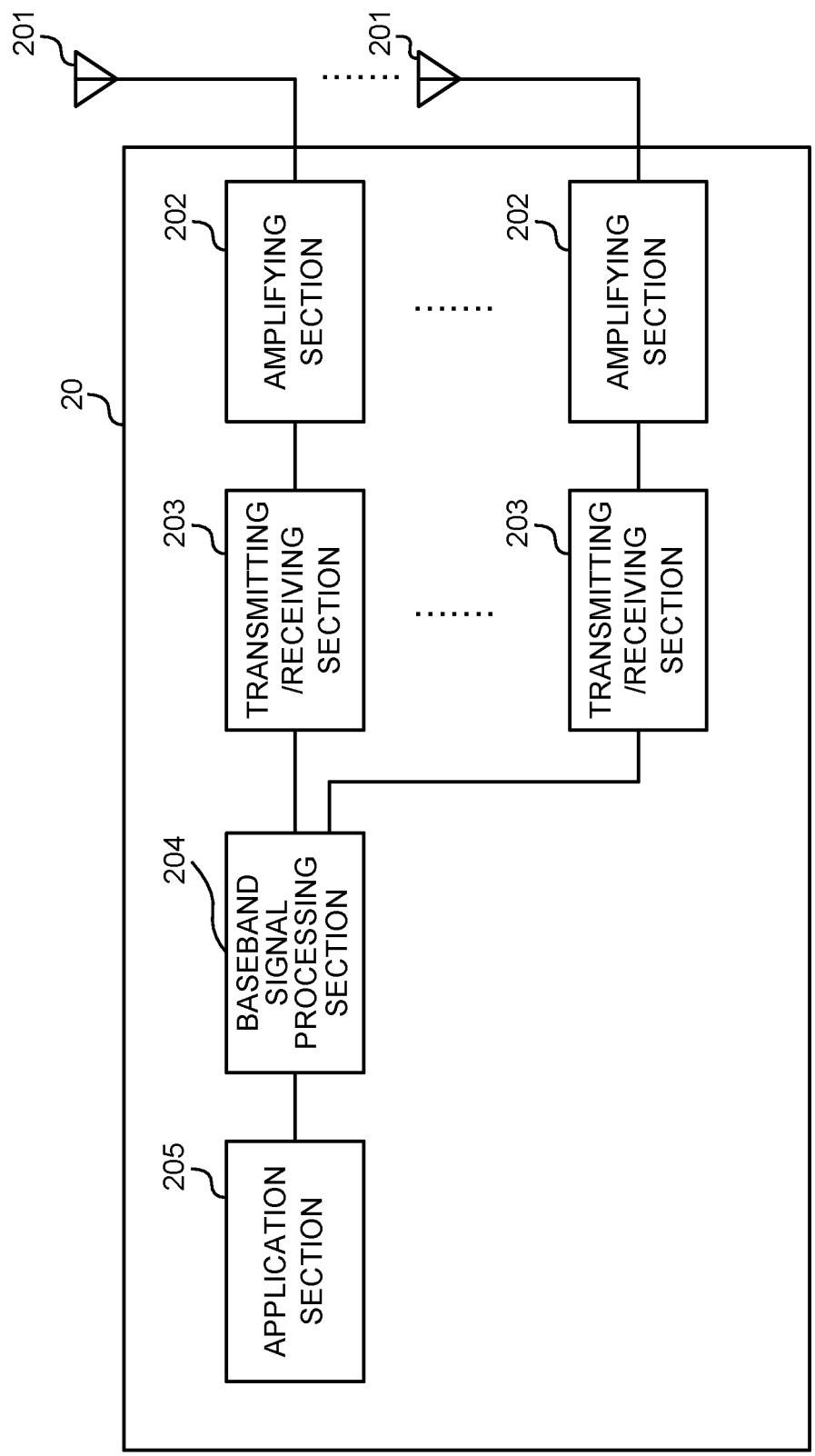
FIG. 12 is a diagram to show an exemplary overall structure of a user terminal according to one embodiment of the present invention.

FIG. 12 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 receive given signals (for example, MRS, SSS, DMRS, etc.) from the radio base station 10. Also, the transmitting/receiving sections 203 may report (transmit) the measurement results (for example, RRM measurement results, CSI measurement results, etc.) output from the measurement section 405, to the radio base station 10.

Also, the transmitting/receiving sections 203 may receive given signals from the radio base station 10. Also, the transmitting/receiving sections 203 may receive reference signals from the radio base station 10.

Also, the transmitting/receiving sections 203 may receive information about parameters that apply in common to multiple resources for reference signals. Also, the transmitting/receiving section 203 may receive information about the associations of one of a number of resources with indicators. Also, the transmitting/receiving sections 203 may receive indicators based on the results of measurement by the user terminal using a given signal. Also, the transmitting/receiving sections 203 may receive information about the associations between resources for given signals and indicators.

Also, the transmitting/receiving sections 203 may transmit a report that includes measurement results using reference signals in part of the resources, and information about the measured resources.

Figure 13:
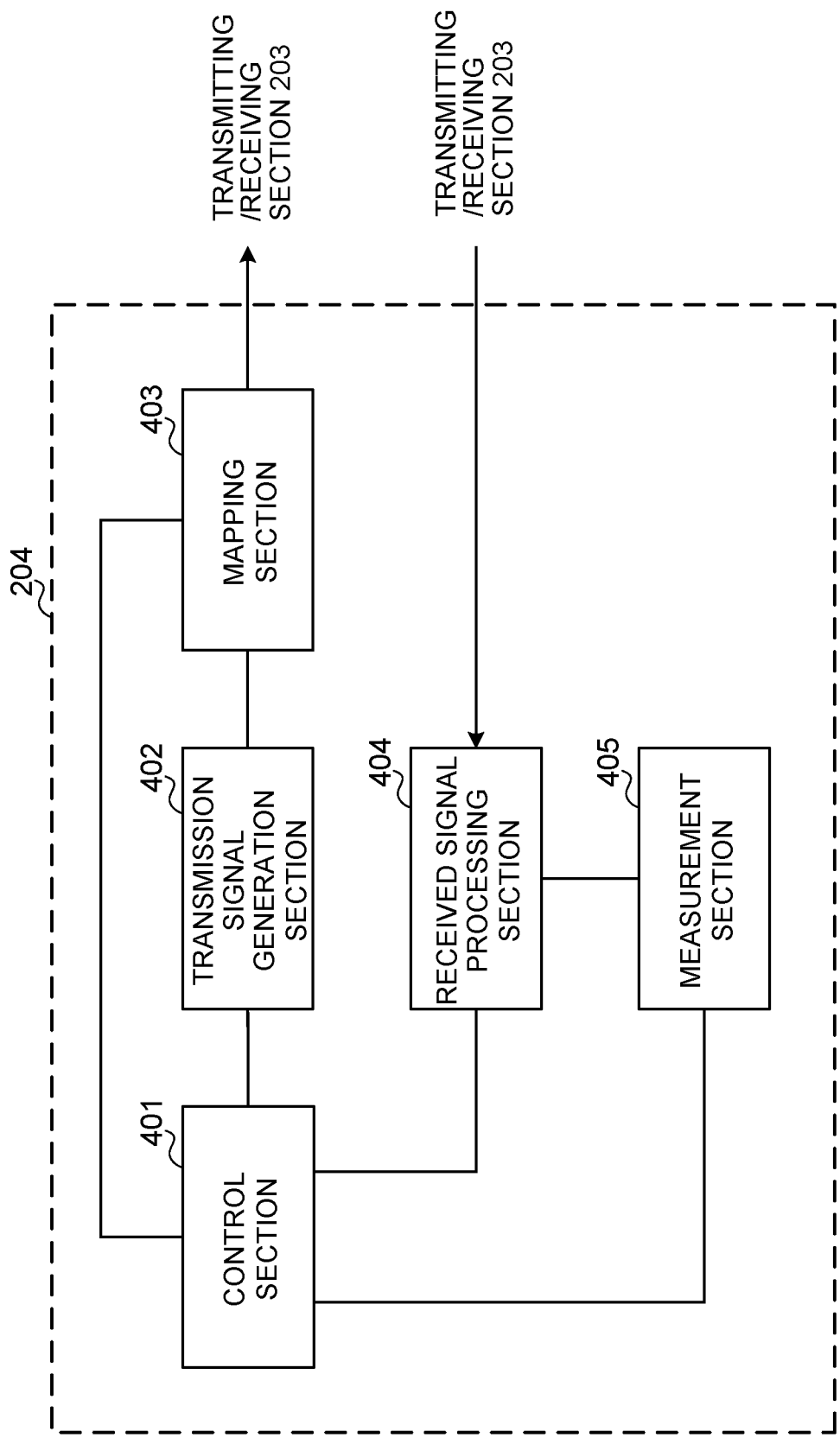
FIG. 13 is a diagram to show an exemplary functional structure of a user terminal according to one embodiment of the present invention.

FIG. 13 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may exert control so that transmitting beams and/or receiving beams are formed by using digital BF (for example, precoding) by the baseband signal processing section 104 and/or analog BF (for example, phase rotation) by the transmitting/receiving sections 103. The control section 401 may exert control so that beams are formed based on downlink propagation path information, uplink propagation path information, and so on. These pieces of propagation path information may be obtained from the received signal processing section 404 and/or the measurement section 405.

Furthermore, when various kinds of information reported from the radio base station 10 are acquired via the received signal processing section 404, the control section 401 may update the parameters to use in control based on these pieces of information.

The control section 401 may also control the reporting of the results of measurement using reference signals in part of multiple resources, and information about the measured resources, based on parameter information.

The control section 401 may also control measurement using reference signals (for example, all CSI-RSs indicated in common resource configuration information) in multiple resources. The control section 401 may also control the reporting of results that fulfil a given condition, among measurement results, and information about the resources corresponding to the results fulfilling a given condition.

The control section 401 may also control measurement using the reference signals in resources corresponding to indicators (for example, in CSI-RSs indicated in CSI-RS-ID association information).

Also, the control section 401 may control measurement using the reference signals in resources corresponding to indicator received (for example, CSI-RS-IDs).

Furthermore, the control section 401 may control measurement using the reference signals in resources associated with the resource (for example, the SS block index) of a given signal detected.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401.

The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 14:
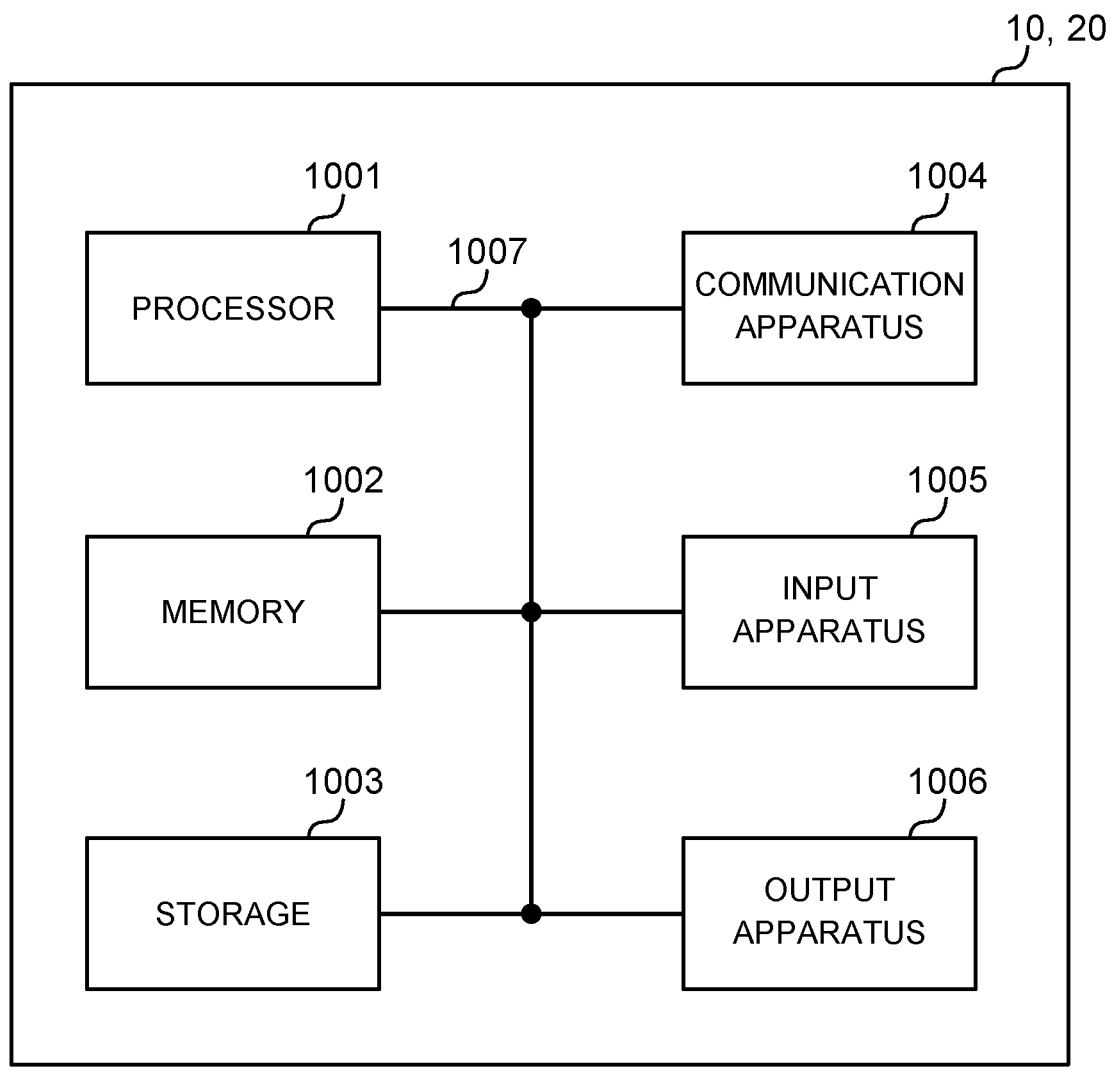
FIG. 14 is a diagram to show an exemplary hardware structure of a radio base station and a user terminal according to one embodiment of the present invention.

For example, the radio base station, user terminals and so on according to embodiments of the present invention may function as a computer that executes the processes of the radio communication method of the present invention. FIG. 14 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when 1 slot or 1 mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 mini-slot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented in other information formats. For example, radio resources may be specified by given indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly (by, for example, not reporting this piece of information).

Decisions may be made in values represented by 1 bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission/reception point (TRP)," "transmission point," "reception point," "femtocell," "small cell," or may be called by like terms.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideB and), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access." As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

The term "A and B are different" as used in the specification or in claims may mean that A and B are different from each other.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives, for each cell to measure, a plurality of Channel State Information Reference Signal (CSI-RS) resource indices corresponding respectively to a plurality of CSI-RS resources and configuration information that is common to the plurality of CSI-RS resources; and
   a processor that performs Radio Resource Management (RRM) measurement by using the configuration information and at least one of the plurality of CSI-RS resources,
   wherein the receiver receives information indicative of synchronization signal block indices that are associated with the plurality of CSI-RS resource indices, and
   the processor performs the RRM measurement by using a CSI-RS resource that is associated with a synchronization block index of a detected synchronization signal block.

2. The terminal according to claim 1, wherein the CSI-RS resource associated is quasi-co-located (QCL) with the detected synchronization signal block.

3. The terminal according to claim 2, wherein the configuration information indicates a band that is common to the plurality of CSI-RS resources.

4. The terminal according to claim 2, wherein the receiver receives information indicative of a maximum number of measurement results to report.

5. The terminal according to claim 1, wherein the configuration information indicates a band that is common to the plurality of CSI-RS resources.

6. The terminal according to claim 5, wherein the configuration information indicates the band in units of Physical Resource Block (PRB).

7. The terminal according to claim 6, wherein the receiver receives information indicative of a maximum number of measurement results to report.

8. The terminal according to claim 5, wherein the receiver receives information indicative of a maximum number of measurement results to report.

9. The terminal according to claim 1, wherein the receiver receives information indicative of a maximum number of measurement results to report.

10. A radio communication method for a terminal, comprising:
    receiving, for each cell to measure, a plurality of Channel State Information Reference Signal (CSI-RS) resource indices corresponding respectively to a plurality of CSI-RS resources and configuration information that is common to the plurality of CSI-RS resources;

performing Radio Resource Management (RRM) measurement by using the configuration information and at least one of the plurality of CSI-RS resources, receiving information indicative of synchronization signal block indices that are associated with the plurality of CSI-RS resource indices; and performing the RRM measurement by using a CSI-RS resource that is associated with a synchronization block index of a detected synchronization signal block.

11. A system comprising a terminal and a base station, wherein:

the terminal comprises:

a receiver that receives, for each cell to measure, a plurality of Channel State Information Reference Signal (CSI-RS) resource indices corresponding respectively to a plurality of CSI-RS resources and configuration information that is common to the plurality of CSI-RS resources; and a processor that performs Radio Resource Management (RRM) measurement by using the configuration information and at least one of the plurality of CSI-RS resources, and the base station comprises:

a transmitter that transmits the plurality of CSI-RS resource indices and the configuration information, wherein the receiver, of the terminal, receives information indicative of synchronization signal block indices that are associated with the plurality of CSI-RS resource indices, and the processor, of the terminal, performs the RRM measurement by using a CSI-RS resource that is associated with a synchronization block index of a detected synchronization signal block.

* * * * *